UNITED STATES PATENT OFFICE.

KIKUNAE IKEDA AND SABUROSUKE SUZUKI, OF TOKYO, JAPAN.

NUTRITIVE AND FLAVORING SUBSTANCE AND PROCESS OF MAKING SAME.

1,035,591. Specification of Letters Patent. Patented Aug. 13, 1912.

No Drawing. Application filed April 23, 1909. Serial No. 491,726.

*To all whom it may concern:*

Be it known that we, KIKUNAE IKEDA and SABUROSUKE SUZUKI, subjects of the Emperor of Japan, residing at 13 Akebonocho Hongo-ku and 14 Atagocho Nichome Shiba-ku, respectively, Tokyo, in the Empire of Japan, have invented certain new and useful Improvements in Nutritive and Flavoring Substances and Processes of Making Same, of which the following is a specification.

Our invention relates to nutritive and flavoring substances containing salts of glutamic acid as essential component. The fact that the monovalent anion $C_5H_8NO'_4$ of glutamic acid presents intense meat-like taste, has been discovered by us in the course of chemical investigation of the constituents of the sea-weed *Laminaria japonica*. The intensity of the flavoring power of a glutamate can be judged from the fact, that one part of monosodium glutamate $NaC_5H_8NO_4$ dissolved in 3000 parts of water is just perceptible to taste. As the corresponding flavoring values of cane-sugar and table salt are 1 to 200 and 1 to 400 respectively, it may be said that the flavoring power of monosodium glutamate is 15 times as strong as that of cane-sugar and 7 times that of table salt. That glutamates of non-poisonous bases are not only harmless, but very probably positively nutritious, can be inferred from the fact that glutamic acid is one of the chief hydrolytic products of proteins and is contained in considerable quantity in meat extract. Hence nothing stands in the way of wide application of pure glutamates as flavoring, provided they could be produced at reasonable cost. Before our invention neither free glutamic acid nor its salts have found any practical application and the price of the acid has been enormously high, while the salts have not at all been produced for sale. As a result of the present process however the substance may be made very cheaply, which fact suffices to demonstrate the novelty and usefulness of our invention.

The process is carried out as follows: Glutamic acid, which is most advantageously obtained from the hydrolytic products of albuminous substances by the processes to be described below, is neutralized in presence of water with caustic soda or sodium bicarbonate so as to form mono-sodium glutamate $NaC_5H_8NO_4$. This salt is amphoteric and its solution turns both red and blue litmus paper violet. The end point of neutralization cannot be precisely determined by means of an indicator. Hence it is well to take weighed or measured quantities of the acid and base for the purpose of neutralization. Mono-sodium glutamate, which has hitherto been very little investigated by chemists, is perhaps the only salt of glutamic acid with non-poisonous metallic radicals that crystallizes well. As its solubility in water varies greatly with temperature, purification by crystallization is particularly easy. The purified salt is white, almost inodorous and quite non-deliquescent. This salt is the best flavoring substance hitherto produced, on account of its intense and pure meat-like taste. With cane-sugar and table salt it will form a staple substance for giving taste to foods.

A mixture of glutamic acid with equivalent quantity of sodium bicarbonate or carbonate may be made instead of mono-sodium glutamate and is nearly as useful, as the mixture is non-deliquescent. Other salts of glutamic acid, which have only one of the two carboxylic hydrogen atoms replaced by metallic radicals, such as mono-potassium glutamate $KC_5H_8NO_4$, calcium diglutamate $Ca(C_5H_8NO_4)_2$, etc., can also be produced in the similar manner and used for the same purpose. But as these salts are mostly difficultly crystallizable and deliquesce in moist air they are not so well fitted for daily use as the sodium salt.

There are cases as described below in which a mixture of glutamate with other substances is produced much more easily than pure glutamic acid or its salt. In such cases mixtures so obtained may be employed as flavoring, provided the other substances have no obnoxious properties, such as bad odor or taste or poisonous action.

Glutamic acid for the purpose of making glutamates as described in the foregoing paragraphs, is most advantageously obtained from the hydrolytic products of albuminous substances. The proteins best fitted for the purpose are those of vegetable origin yielding a relatively large amount of glutamic acid on complete hydrolysis. These are gluten from wheat, glycinin from soy bean and the like. But animal proteins such as casein can also be employed. The protein is hydrolyzed by heating it with hydrochloric or sulfuric acid in such concentration and quantity that there is considerable excess over what is required for the complete combination with the bases and amino-acids produced by the hydrolysis. The dark colored humus-like substance generated during the process is removed by filtration.

The further treatment differs according to the nature of the acid employed. When hydrochloric acid is used the resulting solution is subjected to distillation until the remaining liquid attains a specific gravity of 1.20–1.25. The greater part of the free hydrochloric acid is recovered in the distillate. From the residue hydrochlorid of glutamic acid is obtained as crystals on standing for some days, and a second crop of crystals is obtained from the mother liquor. Crude hydrochlorid of glutamic acid is purified by recrystallization from aqueous solution. In order to get glutamic acid a concentrated solution of the hydrochlorid is exactly half neutralized with caustic soda. Glutamic acid, which is but sparingly soluble in cold water, is precipitated as crystalline powder. The acid so obtained is then worked up to mono-sodium glutamate in the manner hereinbefore described.

Example I: 200 kilograms of moist gluten is heated to 108°–110° C. in a capacious earthenware vessel with 150 liters of hydrochloric acid of specific gravity 1.16. The heating is continued for about 15 hours. The liquid is then filtered from humus-like substance and concentrated until the specific gravity 1.20 is reached. The concentrated liquid is allowed to stand for about a week, in which time the crystallization of glutamic acid hydrochlorid is ended and the whole turns into crystalline magma. The separation of the crystals from the mother liquor is effected by means of a centrifugal. The mother liquor is then concentrated by evaporation until the specific gravity of about 1.25 is reached and set aside for 3–4 weeks for crystallization. Usually two layers of crystalline deposits are formed, of which the upper one consists largely of glutamic acid hydrochlorid. The total yield of the pure hydrochlorid lies between 8 and 9 per cent. of the moist gluten employed. The hydrochlorid is then worked up to mono-sodium glutamate. When hydrochlorid of glutamic acid is neutralized with soda in a suitable proportion a mixture of mono-sodium glutamate and sodium chlorid is obtained containing about $\frac{1}{4}$ of the latter salt by weight. This mixture is non-deliquescent when free from other substances, and forms an excellent flavoring substance. The presence of common salt is not at all objectionable, as it rather enhances the flavoring power of the glutamate. Crude hydrochlorid of glutamic acid may also be used for the purpose, but then the neutralized product does not crystallize well. It may however be used as syrup or solution. When sulfuric acid is employed for hydrolysis of albuminous substance the acid is removed by adding a slight excess of slaked lime and the calcium sulfate produced is filtered away. The solution is then put into a vacuum evaporator and concentrated. During this process free ammonia and bad smelling substances are driven away with steam. The concentrated solution or syrup or semi-solid mass obtained in this manner forms an excellent flavoring for certain purposes, for example in making sauces. The presence of various amino-acids and other products of hydrolysis of proteins is not detrimental in such cases. The nutritive value will be increased by these substances and the sweet taste of many amino-acids will doubtless contribute to the flavoring power though to a subordinate degree. This sort of flavoring is brown in color, has but slight odor, and does not putrefy readily. It contains a considerable quantity of glutamic acid in the form of salts of ammonium, organic bases, calcium, etc. It is of course to these glutamates that the product owes its high flavoring power.

Example II: Pulverized soy bean, which has previously been freed from oil by extraction with ligroin, is boiled with water with or without addition of a little soda and filtered. On acidulating the filtrate with sulfuric acid, albuminous substance, consisting chiefly of glycinin, is precipitated. By means of a filter press the protein is obtained in the state of moist cake containing about 60% of water. The cake is disintegrated and mixed with water and sulfuric acid, in such proportions, that to one part of dry protein come one part of sulfuric acid (as $H_2SO_4$) and three parts of water. The mixture is heated in a lead lined iron vessel to about 107° C. and kept at this temperature. The protein goes into solution gradually, leaving dark humus-like substance. The hydrolysis is completed in about 15 hours. The liquid is filtered from the humus-like substance, diluted with equal volume of water, and slaked lime is added in slight excess. The calcium sulfate produced is removed by filtration and the filtrate is concentrated in a vacuum evaporator until the volume is reduced to about one-fifth. The concentrated solution is then allowed to cool and left for some days. The deposit formed thereby consists of calcium sulfate mixed with leucin, tyrosin, and the like. The liquid filtered from the deposit has a dark brown color, and a faint smell and is particularly well fitted for the manufacture of Japanese sauce.

We claim:—

1. The process of manufacturing flavoring substances containing salts of glutamic acid as essential component, which consists in hydrolyzing albuminous materials by treatment with a strong acid, and neutralizing the resulting product with soda.

2. The process of manufacturing flavoring substances containing salts of glutamic acid as essential component, which consists in hydrolyzing an albuminous material which will yield glutamic acid or a compound thereof upon hydrolysis by treatment with a strong acid, removing humus-like material, and neutralizing the resulting product with a suitable base.

3. The process of manufacturing flavoring substances containing salts of glutamic acid as essential component, which consists in hydrolyzing albuminous materials by heating the said albuminous materials with a strong acid to a temperature of 108–110° C. for several hours, removing humus-like material, and neutralizing the resulting product with a suitable base.

4. The process of manufacturing flavoring substances containing salts of glutamic acid as essential component, which consists in hydrolyzing albuminous material by heating the albuminous material with hydrochloric acid for several hours, filtering the liquid from humus-like substance and concentrating the liquid, and separating the glutamic acid hydrochlorid from the concentrated liquid by crystallization.

5. The process of manufacturing flavoring substances containing salts of glutamic acid as essential component, which consists in hydrolyzing an albuminous material by heating the same with hydrochloric acid for several hours, filtering the liquid from humus-like substance and concentrating the liquid, allowing the concentrated liquid to stand for about a week, separating the crystals of glutamic acid hydrochlorid which have formed from the mother-liquor, and concentrating the mother-liquor and separating additional quantities of glutamic acid hydrochlorid by crystallization.

6. The process of manufacturing flavoring substances containing salts of glutamic acid as essential component, which consists in hydrolyzing an albuminous material by heating the same for several hours with hydrochloric acid to a temperature of 108–110° C., filtering the liquid from humus-like substance and concentrating the liquid, allowing the concentrated liquid to stand for about a week, separating the crystals of glutamic acid hydrochlorid which have formed from the mother-liquor, and concentrating the mother-liquor and separating additional quantities of glutamic acid hydrochlorid by crystallization.

7. The process of manufacturing flavoring substances containing salts of glutamic acid as essential component, which consists in hydrolyzing an albuminous material by heating the same with hydrochloric acid for several hours, filtering the liquid from humus-like substance and concentrating the liquid, allowing the liquid to stand and separating the formed glutamic acid hydrochlorid therefrom by crystallization, and then converting the glutamic acid hydrochlorid into mono-sodium glutamate.

8. The process of manufacturing flavoring substances containing salts of glutamic acid as essential component, which consists in hydrolyzing an albuminous material by heating the same with hydrochloric acid for several hours, filtering the resulting liquid from humus-like substance and concentrating the liquid, allowing the concentrated liquid to stand and separating the glutamic acid hydrochlorid by crystallization from the liquid, and then subjecting the said glutamic acid hydrochlorid to treatment with a suitable quantity of soda so as to obtain a mixture consisting of mono-sodium glutamate and sodium-chlorid for use as flavoring material.

9. The process of manufacturing flavoring substances containing salts of glutamic acid as essential component, which consists in hydrolyzing gluten by heating the same with hydrochloric acid for several hours, filtering the liquid from humus-like substance and concentrating the liquid, allowing the concentrated liquid to stand and separating the formed glutamic acid hydrochlorid by crystallization from the liquid, and then subjecting the said glutamic acid hydrochlorid to treatment for use as flavoring material.

10. The process of manufacturing flavoring substances containing salts of glutamic acid as essential component, which consists in hydrolyzing gluten by heating the same with hydrochloric acid for several hours, filtering the resulting liquid from humus-like substance and concentrating the liquid, allowing the concentrated liquid to stand and separating the glutamic acid hydrochlorid by crystallization from the liquid, and then treating the said glutamic acid hydrochlorid with soda in order to obtain flavoring material.

11. The process of manufacturing flavoring substances containing salts of glutamic acid as essential component, which consists in hydrolyzing gluten by heating the same with hydrochloric acid to a temperature of 108–110° C. for about 15 hours, filtering the resulting liquid from humus-like substance and concentrating the liquid, allowing the concentrated liquid to stand for about a week, separating the formed glutamic acid hydrochlorid by crystallization from the liquid, and then converting the glutamic acid hydrochlorid into mono-sodium glutamate.

12. The process of manufacturing flavoring substances containing salts of glutamic acid as essential component, which consists in hydrolyzing moist gluten by heating the same with hydrochloric acid of specific gravity 1.16 for about 15 hours to a temperature of 108–110° C., filtering the resulting liquid from humus-like substance and concentrating the liquid until it has attained a specific gravity of 1.20, allowing the concentrated liquid to stand for about a week, separating the formed glutamic acid hydrochlorid from the liquid by crystallization, and then treating the formed glutamic acid hydrochlorid with soda in order to obtain flavoring material.

13. The process of manufacturing flavoring substances containing salts of glutamic acid as essential component, which consists in heating moist gluten with hydrochloric acid of specific gravity 1.16 for about 15 hours to a temperature of 108–110° C. in the proportions of 200 kilograms of said moist gluten to 150 liters of hydrochloric acid, filtering the liquid from humus-like substance and concentrating the liquid until the specific gravity of 1.20 is attained, allowing the concentrated liquid to stand for about a week, separating the formed glutamic acid hydrochlorid from the liquid by crystallization, and then treating the said glutamic acid hydrochlorid with soda in order to obtain flavoring material.

14. The process of manufacturing monosodium glutamate, which consists in heating moist gluten with hydrochloric acid of specific gravity 1.16 for about 15 hours to a temperature of 108–110° C. in the proportions of 200 kilograms of said moist gluten to 150 liters of said hydrochloric acid, filtering the liquid from humus-like substance and concentrating the liquid until the specific gravity of 1.20 is attained, allowing the concentrated liquid to stand for about a week, removing the glutamic acid hydrochlorid which has crystallized from the liquid, concentrating the mother-liquor until the specific gravity of about 1.25 is attained and allowing it to stand, separating the additional quantity of glutamic acid hydrochlorid which has crystallized from the mother-liquor, and then treating the said glutamic acid hydrochlorid with a sodium compound in order to obtain mono-sodium glutamate.

15. In the manufacture of flavoring substances the process which comprises hydrolyzing albuminous material to form a substance containing glutamic acid, and treating the resulting substance with an alkali to convert the glutamic acid into a glutamate.

16. In the manufacture of flavoring substances the process which comprises hydrolyzing albuminous material by treatment with an acid in excess to form a substance containing glutamic acid, amino acids and ammonia, removing the excess acid used, and heating the resulting product to remove objectionable volatile constituents and ammonia.

17. As a new product a nutritive and flavoring substance formed by the hydrolysis of albuminous material, and containing as an essential constituent a salt of glutamic acid.

18. As a new product a nutritive and flavoring substance formed by the hydrolysis of albuminous material, and containing as an essential constituent a sodium salt of glutamic acid.

19. As a new product a nutritive and flavoring extract comprising a salt of glutamic acid, and amino acids, and resulting from the hydrolysis of albuminous material.

In testimony whereof we affix our signatures in presence of two witnesses.

KIKUNAE IKEDA.
SABUROSUKE SUZUKI.

Witnesses:
JAMES B. DAVIES,
JETSZYA HAYAKAWA.